United States Patent [19]
Shimoda

[11] Patent Number: 5,633,727
[45] Date of Patent: May 27, 1997

[54] CHARACTER IMAGE PROCESSING APPARATUS

[75] Inventor: Isamu Shimoda, Zama, Japan

[73] Assignee: Canon Kabushiki Kaisha, Tokyo, Japan

[21] Appl. No.: 371,517

[22] Filed: Jan. 11, 1995

Related U.S. Application Data

[63] Continuation of Ser. No. 913,818, Jul. 16, 1992, abandoned.

[30] Foreign Application Priority Data

Jul. 31, 1991 [JP] Japan ..................... 3-214298

[51] Int. Cl.$^6$ ..................... H04N 1/00; H04N 1/393; G03B 27/52
[52] U.S. Cl. ..................... 358/403; 358/451; 355/55; 382/114
[58] Field of Search ..................... 358/403, 474, 358/483, 485, 471, 451, 450, 452, 453, 448, 496; 355/55, 243, 50, 462, 466, 244; 382/9, 50

[56] References Cited

U.S. PATENT DOCUMENTS

| | | | |
|---|---|---|---|
| 4,538,183 | 8/1985 | Kanno et al. | |
| 4,679,155 | 7/1987 | Mitsuka | 358/450 |
| 4,751,583 | 6/1988 | Levine | 358/403 |
| 4,768,099 | 8/1988 | Mukai | 358/403 |
| 4,918,542 | 4/1990 | Nagashima et al. | 358/474 |
| 4,954,912 | 9/1990 | MacDonald et al. | 358/452 |
| 4,959,737 | 9/1990 | Nakatani | 358/474 |
| 4,980,706 | 12/1990 | Someya | 358/453 |
| 5,132,809 | 7/1992 | Kikuchi et al. | 358/403 |
| 5,191,440 | 3/1993 | Levine | 358/452 |
| 5,222,157 | 6/1993 | Yoneda et al. | 358/403 |

Primary Examiner—Edward L. Coles, Sr.
Assistant Examiner—Kimberly A. Williams
Attorney, Agent, or Firm—Fitzpatrick, Cella, Harper & Scinto

[57] ABSTRACT

The invention relates to a document image processing apparatus in which a document image is lighted by a lighting device and is photographed and the photographed document image is displayed on a display, wherein the apparatus has a memory comprising a volatile memory device or/and a non-volatile memory device and a controller having control means which includes an operational device therein and can intermittently light on/off the lighting device, thereby enabling the document image to be stored and reproduced. The display is constructed by a non-thermion device such as liquid crystal or the like and the controller has means to intermittently light on/off a light source of the lighting device, so that an electric power consumption can be reduced and a portability is improved.

18 Claims, 4 Drawing Sheets

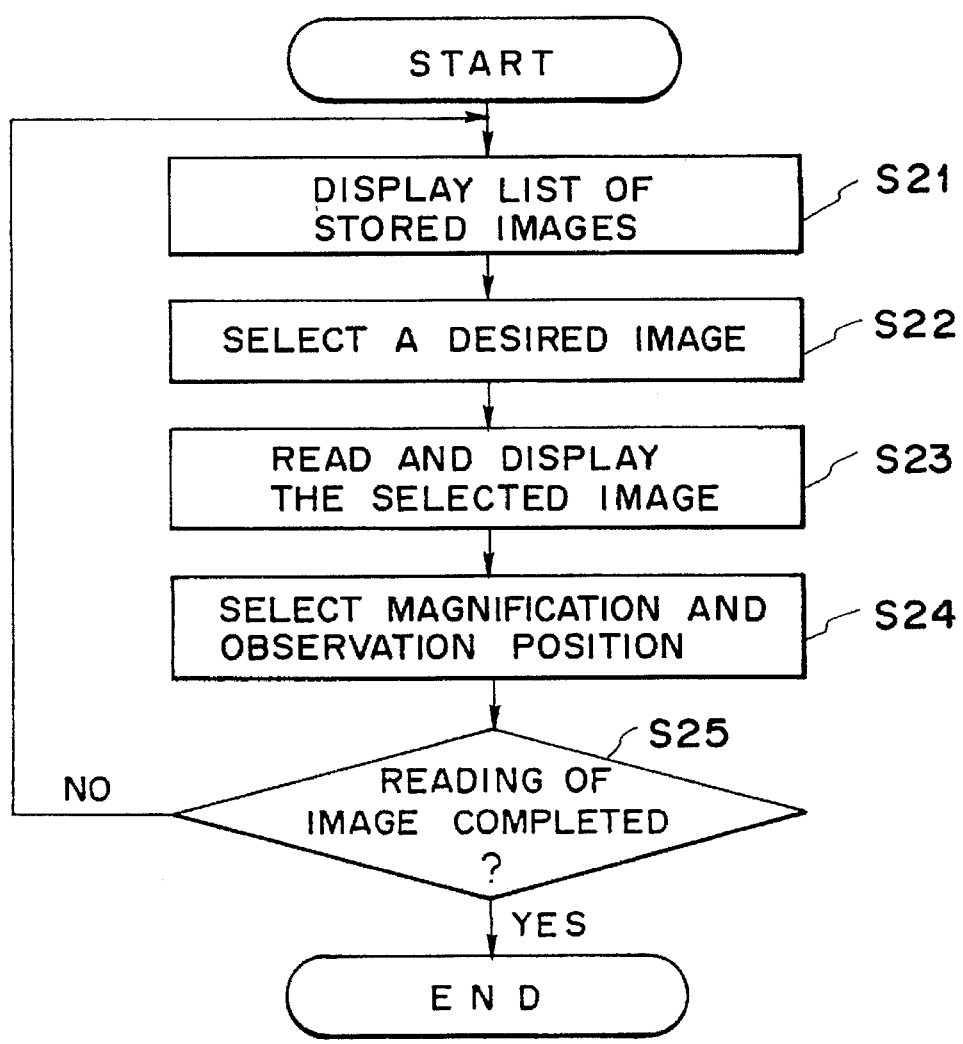

CHARACTER IMAGE PROCESSING APPARATUS

This application is a continuation of application Ser. No. 07/913,818 filed Jul. 16, 1992, now abandoned.

BACKGROUND OF THE INVENTION

1. Field of the Invention

The invention relates to a document image processing apparatus and, more particularly, to a document image processing apparatus such as an enlarging reading apparatus or the like for enlarging a document for a visually impaired person and for displaying the enlarged document image.

2. Related Background Art

According to the fact-finding survey of February in 1987 by the Ministry of Public Welfare in Japan, the number of physically handicapped persons (ages: 18 or more) in Japan is equal to 2,400,000. Among them, the number of visually impaired persons is equal to 307,000, which corresponds to 12.7%. Among them, the number of persons who are employed as full-time workers in the whole country of Japan is equal to 17,000, which corresponds to at most 5.5% of the whole number of visually impaired persons.

The ability of a visually impaired person to read printed or written characters is considered to be one of the largest hurdles to overcome to more fully participate in the mainstream of society. Societal participation is significantly effected by the ability to communicate with written or printed characters.

There are two methods to overcome this handicap: that is, a method of improving the eyesight function itself having a handicap, and a method of substituting the eyesight function by an auditory sense, tactual sense, or the like in the case where the handicapped function cannot be assisted.

In the former method, when a visually impaired person sees characters or a diagram/table, the eyesight can be improved by using lenses (glasses). Further, characters or a diagram/table is photographed by using a video camera or the like and is subjected to an electrical process and the characters or diagram/table is enlarged, thereby enabling the characters or diagram/table to be easily seen.

FIG. 5 is a block constructional diagram of a Vantage® (registered tradename) made by Telesensory Systems, Inc. of U.S.A. as an example of the enlarging reading apparatus.

The enlarging reading apparatus comprises: a lighting device 52 to light a document 51; a camera 53 to photograph the document 51 lighted by the lighting device 52; a processor 54 to process the image of the document 51 photographed by the camera 53; and a display 55 to display the document 51 whose image has been processed by the processor 54.

In the enlarging reading apparatus, an illuminating light 56 from the lighting device 52 illuminates the document 51 put on a platen 57. The document 51 is photographed by the camera 53. The image of the document 51 which has passed through a zoom lens (not shown) of the camera 53 is converted into the video electric signal by a vidicon (image pickup tube) or a CCD (charge coupled device) and supplied to the processor 54. The processor 54 scans onto the display screen and performs image processes such as deletion of unnecessary portions by masking, adjustment of the brightness and contrast of the display screen, inversion of black and white on the display screen, and the like are executed on the video electric signal. In accordance with the above image processes by the processor 54 or by a combination with the display size, the document image of preselected magnification (for instance, 3 to 45 times) based on the degree of visual impairment is displayed on the display 55. A green or amber CRT (cathode ray tube) of the 14-inch size is used as a display 55.

The above conventional enlarging reading apparatus (document image processing apparatus), however, has the following problems. That is:

(1) Electric power consumptions of the lighting device and the display are large and a usable power source is limited to an AC power source.

(2) Since the CRT is used, a weight of apparatus increases and the apparatus is poor in portability.

(3) Only the image of the document which is at present being lighted by the lighting device is displayed on the display and the photographed document cannot be preserved.

(4) Since the document is mechanically moved by the movement of the platen, it is difficult to move the document at a high speed.

SUMMARY OF THE INVENTION

It is the first object of the invention to provide an enlarging reading apparatus for enlarging a document for a visually impaired person and for displaying the enlarged document image and also to provide an image information processing apparatus of a light weight which can easily perform the storage of the document.

The second object of the invention is to add a storing device comprising a volatile memory device or/and a nonvolatile memory device, so that a photographed document image can be stored and read out.

The third object of the invention is to provide an operational device into a controller, so that the controller can execute various processes at a high speed.

The fourth object of the invention is to intermittently light on/off a lighting device, so electric power consumption is saved.

The fifth object of the invention is to use a non-thermion device such as liquid crystal or the like as a display, so that there is no need to use a high voltage circuit and an electric power consumption is also reduced.

The sixth object of the invention is to fetch a target document image and its peripheral document images or by fetching a target document image and the enlarged target document image, so that the document image can be easily searched.

BRIEF DESCRIPTION OF THE DRAWINGS

FIG. 3 is a diagram showing coordinate axes of a platen;

FIG. 4 is a flowchart showing a reading procedure of a document image; and

DETAILED DESCRIPTION OF THE PREFERRED EMBODIMENTS

An embodiment of the invention will be described in detail hereinbelow with reference to the drawings.

Figure 1:
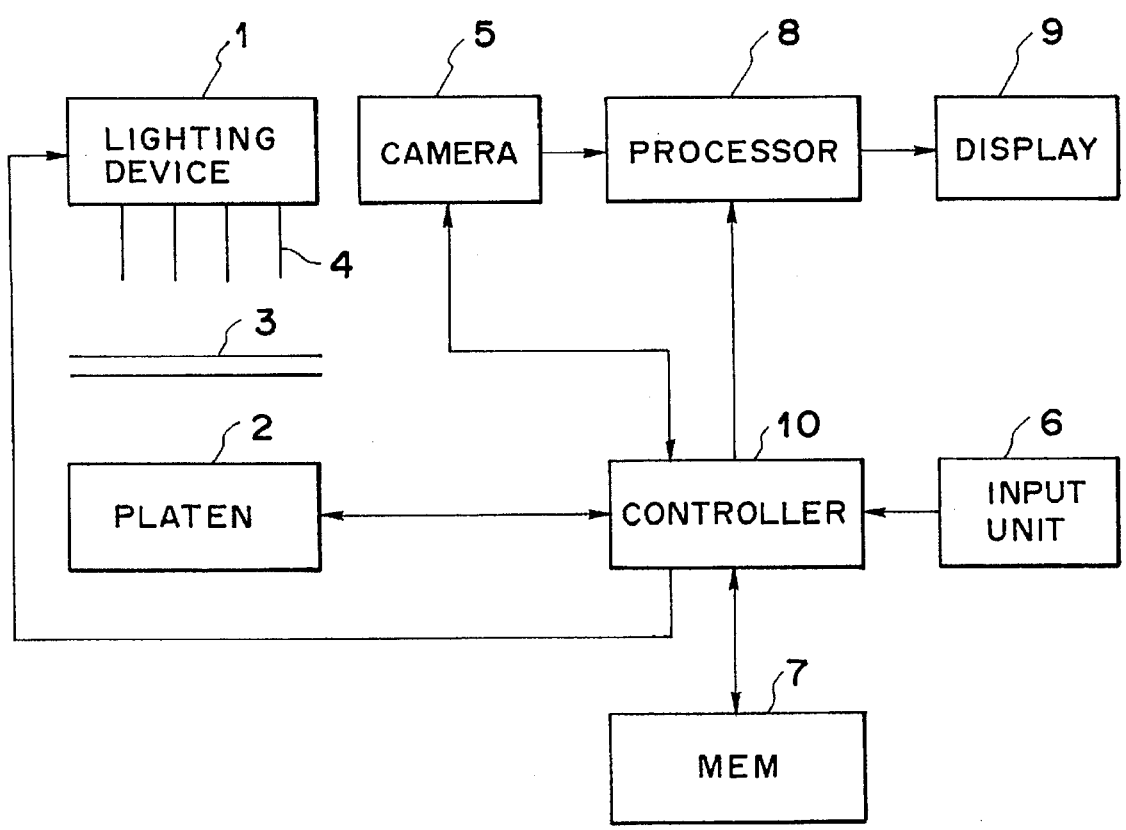
FIG. 1 is a whole block constructional diagram showing an embodiment of a document image processing apparatus according to the invention.

FIG. 1 is a block constructional diagram showing an embodiment of an enlarging reading apparatus as a document image processing apparatus according to the invention.

Reference numeral 1 denotes a lighting device comprising two fluorescent lamps as a light source and a reflecting mirror (not shown). The light source is not limited to the fluorescent lamps but can also use a tungsten lamp or a stroboscopic lamp.

Reference numeral 2 denotes a platen. A document 3 put on the platen 2 is illuminated by an illuminating light 4 (light source) from the lighting device 1.

Reference numeral 5 denotes a camera having a zoom lens (not shown) which can change a magnification by, for instance, an optical magnification of six times. The camera 5 converts the document image transmitted through the zoom lens into the video electric signal by the vidicon or CCD.

Reference numeral 6 denotes an input unit which is used to input the magnification of the document image or the observing position in the inputting and reproducing mode of the document image.

Reference numeral 7 denotes a memory which is constructed by either one of a volatile memory device such as a semiconductor memory or the like, a non-volatile memory device such as a magnetic disk or the like, or a combination of the volatile memory device and the non-volatile memory device. The image data is written into the memory 7. Addresses in the memory 7 are constructed by an image identification number or a symbol which has automatically been supplied from the input unit 6 or a controller, which will be explained hereinlater, coordinate data from the platen 2, and a magnification from the camera 5.

Reference numeral 8 denotes a processor which can execute the scan onto the display screen and the image processes such as deletion of unnecessary portions by masking, adjustment of the brightness and contrast of the display screen, black and white inversion of the screen display, and the like of the video electric signal. The processor 8 can also switch the document image which is lighted at present by the lighting device 1 and the document image read out from the memory 7 and also invert the screen display of only one of those document images.

Reference numeral 9 denotes a display comprising a non-thermion device such as liquid crystal or the like which doesn't need a high voltage circuit.

Reference numeral 10 denotes a controller comprising a microcomputer having an operational device whose electric power consumption is small and which can perform an arithmetic operation at a high speed. The controller 10 controls each of the above apparatuses or devices. That is, the controller 10 has the following control functions.

(1) ON/OFF of the light source of the lighting device 1.

(2) Control of the zoom lens of the camera 5.

(3) Control of the processor 8.

(4) Input of the coordinate data of the platen 2 and movement to the designated position.

(5) Setting of the operating mode and operation parameters by the input unit 6.

(6) Control of the document image stored in the memory 7.

Figure 2:
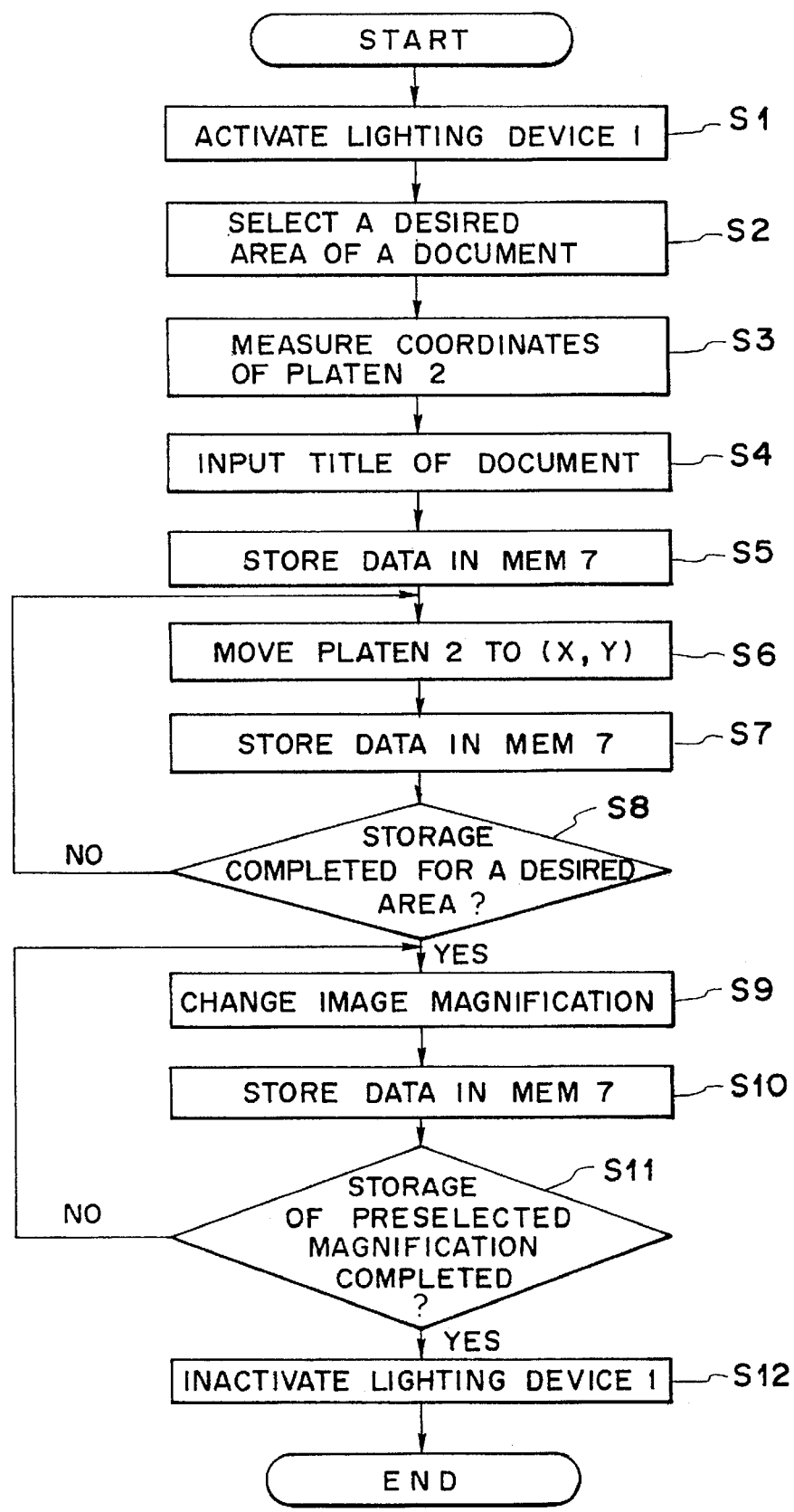
FIG. 2 is a flowchart showing a writing procedure of a document image.
Figure 5:
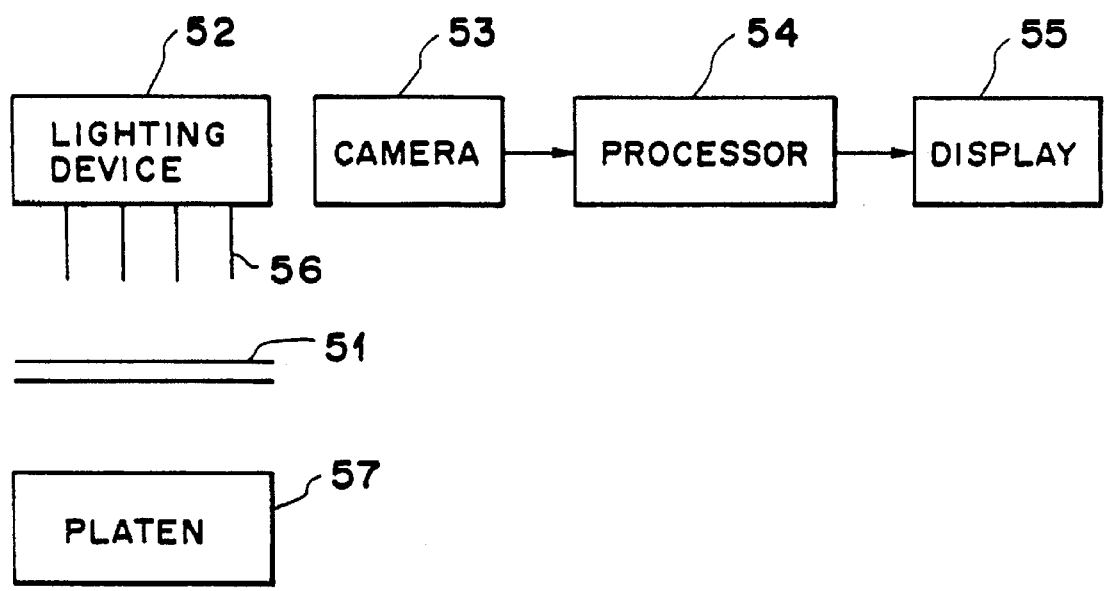
FIG. 5 is a block constructional diagram of a conventional apparatus.

In the above document image processing apparatus, the document image (document) is written into the memory 7 in accordance with a flowchart shown in FIG. 2.

First, in step S1, the controller 10 turns on the light source of the lighting device 1, so that the document is lighted at an illuminance that is necessary for the camera.

Subsequently, the platen 2 is moved and a desired location in the document (target document image) is selected and the magnification of the camera is adjusted (step S2). The desired location and the magnification are supplied from the input unit 6 to the controller 10 by using a keyboard, a mouse, or the like.

The controller 10 subsequently measures the coordinates of the platen 2 (step S3). A title of document is inputted (step S4). Further, a predetermined command is inputted to the input unit 6 and the foregoing image data, document name, coordinates of the platen, and magnification are written into the memory 7 (step S5).

In steps S6 to S8, the document image around the present position is written into the memory 7 by the control of the controller 10.

That is, in step S6, the platen 2 is moved to peripheral position coordinates (X, Y) of the target document image. When the position of the coordinates (X, Y) exceeds a movement limit of the platen, the platen is moved to a movable limit position. Subsequently, the document title, coordinates of the platen (relative position with the target document image or absolute position), and magnification are written into the memory 7 (step S7). Further, a check is made to see if the writing operation to the memory 7 has been completed or not with respect to all of the peripheral portions of the target document image (step S8). If YES, step S9 follows and the controller 10 instructs the camera 5 to automatically change the image magnification. Consequently, for instance, when the image magnification is set to a small value, that is, when an enlargement magnification is reduced, a visual field can be widened. When the image magnification is set to a large value, namely, when the enlargement magnification is increased, the document image can be further finely observed. The change in magnification can be previously fixed, i.e. programmed, to avoid errors regarding such changes. Although the peripheral image data is fetched in steps S6 to S8, when the image magnification is large, there is a case where a photographing object cannot be sufficiently covered. In such a case, further peripheral image data is fetched.

In step S10, the title of document of the image data, coordinates of the platen, and magnification are written into the memory 7.

In step S11, a check is made to see if the writing of the predetermined magnification to the memory 7 has been completed or not. After the completion of the writing of the predetermined magnification was confirmed, and controller 10 turns off the power source of the lighting device 1 (step S12) and the program is finished. According to the invention as mentioned above, by turning on the power source of the lighting device 1 only when the necessary data is written into the memory 7, the electric power consumption can be saved.

FIG. 3 is a diagram showing a positional relation on the coordinates of the platen 2 between the target document image and the peripheral document image.

In the diagram, the image 22 denotes the target document image written in steps S1 to S5 in FIG. 2. Generally, the periphery of the target document image has a high correlation with the target document image, so that reference to the periphery of the target document image is highly probable. Therefore, the images 11 (left upper position), 12 (just over position), 13 (right upper position), 21 (left side), 23 (right side), 31 (left lower position), 32 (just under position), 33 (right lower position) are written into the memory 7 as peripheral image data of the target image 22. That is, in steps S9 to S11, the peripheral document images of the image 22 are sequentially written into the memory 7 in accordance with the order from the image 11.

FIG. 4 is a flowchart showing a control procedure in case of reading out the image data from the memory 7. In the read only document image processing apparatus, the lighting device, camera, platen, and the like are not required but the document image processing apparatus can be constructed by the processor 8, display 9, controller 10, input unit 6, and memory 7.

First, in step S21, a list of stored document images is displayed on the display 9.

Subsequently, a desired image number or symbol is supplied to the controller 10 from the input unit 5 by using a keyboard, a mouse, or the like and an image is selected (step S22).

In step S23, the image data is read out from the memory 7 and displayed on the display 9. In this instance, arbitrary information among the document title of the image data, coordinates of the platen, and magnification is displayed at the corner of the image.

In step S24, the enlargement magnification and the observing position are selected. It will be obviously understood that the data to be selected in the above processing steps is limited to the image data which has already been written in the memory 7.

In the last step S25, a check is made to see if the reading operation of desired image data from the memory 7 has been completed or not (step S25). If NO, the processing routine is returned to step S21 and the list is again displayed. If the reading of the image data has been completed, the program is finished.

According to the embodiment as mentioned above, by dividing the process into two operations, namely, 1) writing the image data into the memory, and
2) reading out and using the image data, the present invention functions in a manner which is not possible in the conventional enlarging reading apparatus.

Further, in the above embodiment, the document image lighted by the lighting device 1 and the document image stored in the memory 7 are switched by the controller 10 and displayed on the display 9. However, it is also preferable to construct in a manner such that the display picture plane on the display 9 is divided into two portions and both of the document image which is being lighted at present by the lighting device and the document image stored in the memory 7 are simultaneously displayed on the display screen of the display 9.

According to the invention as described in detail above, there are the following effects.

(1) Electric power consumptions of the lighting device and the display decreases, the power source which can be used is not limited, and their lives are also prolonged.

(2) Since the images can be stored by adding the memory, it is sufficient to execute the photographing operation once, it is sufficient to light for a short time, and the electric power consumption can be saved.

(3) By using the non-thermion device such as liquid crystal or the like as a display, there is no need to use a high voltage circuit, the electric power consumption decreases, the weight also decreases, and the portability is improved.

(4) The present image and the photographed stored image can be switched and displayed or can be simultaneously displayed.

(5) Since the movement of the document in the reading mode can be controlled by the controller, the document can be moved at a high speed.

What is claimed is:

1. An image processing apparatus, comprising:
    camera means for photographing a document image;
    display means for displaying the document image photographed by said camera means;
    moving means for moving said camera means and the document image relatively to each other so as to cause said display means to display a desired area of the document image;
    selection means for selecting a desired area of the document image displayed by said display means in accordance with the relative movement of said camera means and the document image by said moving means;
    memory means for storing the desired area of the document image selected by said selection means and at least one other area of the document image located at the periphery of the desired area of the document image, with the at least one other area of the document image being photographed by said camera means in accordance with the relative movement of said camera means and the document image by said moving means, wherein said memory means stores the selected area of the document image and only one other area of the document image located at the periphery of the desired area of the document image when a predetermined photographing magnification is selected; and
    control means for controlling said display means to display the document image stored in said memory means.

2. An apparatus according to claim 1, wherein said display means comprises either one of a liquid crystal display and a cathode ray tube display.

3. An apparatus according to claim 1, wherein said moving means comprises a platen.

4. An apparatus according to claim 1, wherein said memory means comprises either one of a semiconductor memory and a magnetic disc memory.

5. An apparatus according to claim 1, further comprising lighting means for lighting the document image upon storage of the document image in said memory means.

6. An apparatus according to claim 1, wherein the at least one other area of the document image is located at one of a left upper position, over position, right upper position, left position, right position, left lower position, under position and right lower position of the desired area of the document image.

7. An apparatus according to claim 1, further comprising input means for inputting a document title corresponding to the document image stored in said memory means.

8. An apparatus according to claim 7, wherein said control means controls said display means to display a list of document titles input by said inputting means and to display the document image corresponding to a selected one of the displayed list of document titles.

9. A method for processing document images comprising the steps of:
    photographing a document image with a camera;
    displaying the photographed document image;
    moving the camera and the document image relative to each other so as to display a desired area of the document image;
    selecting a desired area of the displayed document image in accordance with the relative movement of the camera and the document image;
    storing the selected desired area of the document image in a memory and at least one other area of the document image located at the periphery of the desired area of the document image, with the at least one other area of the document image being photographed by the camera in accordance with the relative movement of the camera and the document image, and storing in the memory a selected area of the document image and only one other area of the document image located at the periphery of the desired area of the document image when a predetermined photographing magnification is selected; and controlling the display of the document image stored in the memory.

10. A method according to claim 9, further comprising the step of providing either one of a liquid crystal display and a cathode ray tube display for displaying the document image.

11. A method according to claim 7, further comprising the step of providing a platen for moving the camera and the document image relative to each other.

12. A method according to claim 7, further comprising the step of providing either one of a semiconductor memory and a magnetic disc memory as the memory.

13. A method according to claim 7, further comprising the step of lighting the document image upon storage of the document image in the memory.

14. A method according to claim 7, wherein the at least one other area of the document image is located at one of a left upper position, upper position, right upper position, left position, right position, left lower position, under position and right lower position of the desired area of the document image.

15. A method according to claim 7, further comprising the step of inputting a document title corresponding to the document image stored in the memory.

16. A method according to claim 15, further comprising the step of displaying a list of document titles and displaying the document image corresponding to a selected one of the displayed list of the document titles.

17. An image processing apparatus, comprising:

camera means for photographing a document image;

display means for displaying the document image photographed by said camera means;

moving means for moving said camera means and the document image relatively to each other so as to cause said display means to display a desired area of the document image;

selection means for selecting a desired area of the document image displayed by said display means in accordance with the relative movement of said camera means and the document image by said moving means;

memory means for storing the desired area of the document image selected by said selection means and at least one other area of the document image located at the periphery of the desired area of the document image, with the at least one other area of the document image being photographed by said camera means in accordance with the relative movement of said camera means and the document image by said moving means, wherein said memory means stores the selected area of the document image and only one other area of the document image located at the periphery of the desired area of the document image when a large photographing magnification is selected; and control means for controlling said display means to display the document image stored in said memory means.

18. A method for processing document images comprising the steps of:

photographing a document image with a camera;

displaying the photographed document image;

moving the camera and the document image relative to each other so as to display a desired area of the document image;

selecting a desired area of the displayed document image in accordance with the relative movement of the camera and the document image;

storing the selected desired area of the document image in a memory and at least one other area of the document image located at the periphery of the desired area of the document image, with the at least one other area of the document image being photographed by the camera in accordance with the relative movement of the camera and the document image, and storing in the memory a selected area of the document image and only one other area of the document image located at the periphery of the desired area of the document image when a large photographing magnification is selected; and controlling the display of the document image stored in the memory.

* * * * *

UNITED STATES PATENT AND TRADEMARK OFFICE
CERTIFICATE OF CORRECTION

PATENT NO. : 5,633,727
DATED : May 27, 1997
INVENTOR(S) : Shimoda

It is certified that error appears in the above-identified patent and that said Letters Patent is hereby corrected as shown below:

<u>COLUMN 7</u>:

Line 11, "claim 7," should read --claim 9,--.
Line 14, "claim 7," should read --claim 9,--.
Line 17, "claim 7," should read --claim 9,--.
Line 20, "claim 7," should read --claim 9,--.
Line 26, "claim 7," should read --claim 9,--.

Signed and Sealed this

Twenty-eighth Day of October, 1997

Attest:

BRUCE LEHMAN

*Attesting Officer*          *Commissioner of Patents and Trademarks*